United States Patent
Maeda

(10) Patent No.: US 12,479,517 B2
(45) Date of Patent: Nov. 25, 2025

(54) VEHICLE BODY STRUCTURE

(71) Applicant: TOYOTA JIDOSHA KABUSHIKI KAISHA, Toyota (JP)

(72) Inventor: Kazuhisa Maeda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 364 days.

(21) Appl. No.: 18/228,830

(22) Filed: Aug. 1, 2023

(65) Prior Publication Data

US 2024/0051616 A1 Feb. 15, 2024

(30) Foreign Application Priority Data

Aug. 10, 2022 (JP) ................................ 2022-128350

(51) Int. Cl.
*B62D 25/02* (2006.01)
*B62D 21/15* (2006.01)
(Continued)

(52) U.S. Cl.
CPC ......... *B62D 27/065* (2013.01); *B62D 21/157* (2013.01); *B62D 25/025* (2013.01); *B62D 25/04* (2013.01)

(58) Field of Classification Search
CPC .. B62D 25/025; B62D 25/04; B62D 25/2036; B62D 27/065; B62D 21/157
(Continued)

(56) References Cited

U.S. PATENT DOCUMENTS 1,664,569 A * 4/1928 Milner ................... B62D 31/02
 296/29
6,053,564 A * 4/2000 Kamata .................. B62D 21/09
 296/187.1
(Continued)

FOREIGN PATENT DOCUMENTS

JP 01078982 A * 3/1989
JP H04-005181 A 1/1992
(Continued)

OTHER PUBLICATIONS

JP01078982 Text (Year: 1989).*

*Primary Examiner* — Dennis H Pedder
(74) *Attorney, Agent, or Firm* — Dinsmore & Shohl LLP

(57) ABSTRACT

A vehicle body structure including: rockers structuring portions of vehicle transverse direction outer sides of a vehicle body lower portion; center pillars, whose lower portion at a vehicle lower side being structured to include an outer side wall portion positioned at vehicle transverse direction outer side of the rocker, and an inner side wall portion positioned at vehicle transverse direction inner side of the rocker; transverse direction supporting portions disposed at interiors of the rockers, at each of the transverse direction supporting portions being formed a transverse direction through-portion that extends in a vehicle transverse direction; and transverse direction mounting portions that are inserted, in the vehicle transverse direction, through outer side inserted-through portions provided in the outer side wall portions, inner side inserted-through portions provided in the inner side wall portions, and the transverse direction through-portions, and that detachably connect the rockers and the lower portions.

3 Claims, 10 Drawing Sheets

(51) Int. Cl.
*B62D 25/04* (2006.01)
*B62D 27/06* (2006.01)

(58) Field of Classification Search
USPC ............... 296/209, 193.06, 29, 30, 187.12
See application file for complete search history.

(56) References Cited

U.S. PATENT DOCUMENTS

| | | | | |
|---|---|---|---|---|
| 8,882,183 | B2* | 11/2014 | Suzuki | B62D 27/023 |
| | | | | 296/203.01 |
| 10,293,861 | B2* | 5/2019 | Jeong | B62D 21/157 |
| 10,486,746 | B2* | 11/2019 | Kawabe | B60K 1/04 |
| 10,494,034 | B2* | 12/2019 | Makowski | B62D 25/2036 |
| 10,836,434 | B2* | 11/2020 | Otoguro | B62D 29/007 |
| 11,396,328 | B2* | 7/2022 | Takahashi | B62D 25/2036 |
| 11,420,681 | B2* | 8/2022 | Kim | B62D 27/065 |
| 11,447,184 | B2* | 9/2022 | Takahashi | B62D 25/025 |
| 11,511,808 | B2* | 11/2022 | Halonen | B62D 25/025 |
| 12,263,883 | B2* | 4/2025 | Kamei | B62D 25/2045 |
| 12,291,279 | B2* | 5/2025 | Kim | B62D 25/025 |
| 2017/0267290 | A1* | 9/2017 | Ayuzawa | B62D 25/04 |
| 2019/0047629 | A1* | 2/2019 | Asa | B62D 27/023 |
| 2022/0250684 | A1* | 8/2022 | Renegar | F16F 7/12 |

FOREIGN PATENT DOCUMENTS

| | | |
|---|---|---|
| JP | H04-143174 A | 5/1992 |
| JP | 6150365 B2 | 6/2017 |
| JP | 2019-034600 A | 3/2019 |
| JP | 2022-534601 A | 8/2022 |

\* cited by examiner

VEHICLE BODY STRUCTURE

CROSS-REFERENCE TO RELATED APPLICATION

This application is based on and claims priority under 35 USC 119 from Japanese Patent Application No. 2022-128350 filed on Aug. 10, 2022, the disclosure of which is incorporated by reference herein.

BACKGROUND

Technical Field

The present disclosure relates to a vehicle body structure.

Related Art

Japanese Patent No. 6150365 discloses a vehicle body of an automobile. In this vehicle body of an automobile, the lower end portions of the center pillars are connected via fastening members to the side sills (rockers) of the vehicle body frame that are parts separate from the center pillars.

However, in the above-described related art, the places where the center pillar and the side sill are connected are dispersed at the vehicle transverse direction outer side and the vehicle transverse direction inner side of the side sill, and it is difficult to devise a reduction in the number of processes of assembling the vehicle body.

SUMMARY

In view of the above-described circumstances, an object of the present disclosure is to provide a vehicle body structure that devises a reduction in the number of assembly processes of a vehicle body in which the center pillar and the rocker are structured as separate parts and are connected together.

A vehicle body structure of a first aspect of the present disclosure includes: rockers that structure portions of vehicle transverse direction outer sides of a vehicle body lower portion, and whose cross-sections seen from a vehicle longitudinal direction are closed cross-sections, and that extend in the vehicle longitudinal direction; center pillars that are parts separate from the rockers and whose lower portions at a vehicle lower side are structured to include outer side wall portions that are positioned at vehicle transverse direction outer sides of the rockers, and inner side wall portions that are positioned at vehicle transverse direction inner sides of the rockers; transverse direction supporting portions disposed at interiors of the rockers, and in which are formed transverse direction through-portions that extend in a vehicle transverse direction; and transverse direction mounting portions that are inserted, in the vehicle transverse direction, through outer side inserted-through portions provided in the outer side wall portions, inner side inserted-through portions provided in the inner side wall portions, and the transverse direction through-portions, and that detachably connect the rockers and the lower portions.

In accordance with the first aspect of the present disclosure, portions of the vehicle transverse direction outer sides of the vehicle body lower portion are structured by the rockers. The cross-section of the rocker as seen from the vehicle longitudinal direction is a closed cross-section, and the rocker extends in the vehicle longitudinal direction.

In the present disclosure, the center pillar and the rocker are made to be separate parts. The lower portion that is at the vehicle lower side of the center pillar has the outer side wall portion that is positioned at the vehicle transverse direction outer side of the rocker, and the inner side wall portion that is positioned at the vehicle transverse direction inner side of the rocker.

By the way, it is thought that, in a structure in which the places where the center pillar and the rocker are connected together are dispersed at the outer side wall portion side and the inner side wall portion side of the center pillar, the number of processes of assembling the vehicle body will increase.

Here, in the present disclosure, the transverse direction supporting portions are disposed at the interior of the rocker. The transverse direction through-portions that extend in the vehicle transverse direction are formed in these transverse direction supporting portions. Further, the outer side inserted-through portions are provided in the outer side wall portion of the center pillar, and the inner side inserted-through portions are provided in the inner side wall portion.

The rocker and the lower portion of the center pillar are detachably connected by the transverse direction mounting portions that are inserted, in the vehicle transverse direction, through the outer side inserted-through portions, the inner side inserted-through portions, and the transverse direction through-portions of the transverse direction supporting portions.

Therefore, in the present disclosure, the places of connection of the rocker and the center pillar are aggregated in the vehicle transverse direction, and the rocker and the center pillar can be connected without work for connecting the rocker and the center pillar being carried out at both the vehicle transverse direction outer side and the vehicle transverse direction inner side.

In a vehicle body structure of a second aspect of the present disclosure, in the first aspect, the transverse direction supporting portions are impact absorbing members that can absorb collision load in the vehicle transverse direction, and the transverse direction supporting portions are disposed at positions that, as seen from the vehicle transverse direction, overlap a battery pack disposed at vehicle transverse direction inner sides of the rockers.

In accordance with the second aspect of the present disclosure, the impact absorbing member, which can absorb collision load in the vehicle transverse direction, is provided at the interior of the rocker. On the other hand, the battery pack is disposed at the vehicle transverse direction inner sides of the rockers. The impact absorbing member is disposed at a position that overlaps the battery pack as seen from the vehicle transverse direction.

Therefore, in the present disclosure, at the time when collision load in the vehicle transverse direction is inputted to the vehicle body, before the collision load is inputted to the battery pack, at least some of the collision load is absorbed by the impact absorbing member.

A vehicle body structure of a third aspect of the present disclosure further includes, in the first or second aspect, vertical direction supporting portions disposed at the interiors of the rockers, and in which vertical direction through-portions that extend in a vehicle vertical direction are formed, wherein upper side wall portions, which are positioned at vehicle upper sides of the rockers, are provided at the lower portions, and the upper side wall portions are detachably connected to the rockers via vertical direction mounting portions that are inserted, in the vehicle vertical direction, through the vertical direction through-portions and through upper side inserted-through portions that are provided in the upper side wall portions.

In accordance with the third aspect of the present disclosure, the vertical direction supporting portions are disposed at the interior of the rocker. The vertical direction through-portions that extend in the vehicle vertical direction are formed in these vertical direction supporting portions.

On the other hand, the upper side wall portions, which are positioned at the vehicle upper side of the rocker, are provided at the lower portion of the center pillar. The upper side inserted-through portions are provided in these upper side wall portions.

The rocker and the lower portion of the center pillar are detachably connected by the vertical direction mounting portions that are inserted, in the vehicle vertical direction, through the upper side inserted-through portions and the vertical direction through-portions of the vertical direction supporting portions.

Therefore, in the present disclosure, the places of connection of the rocker and the center pillar are aggregated in the vehicle vertical direction, and the rocker and the center pillar can be connected without work for connecting the rocker and the center pillar being carried out at both the vehicle upper side and the vehicle lower side.

As described above, the vehicle body structure of the first aspect of the present disclosure has the effect of being able to devise a reduction in the number of assembly processes of a vehicle body in which the center pillars and the rockers are structured as separate parts and are connected together.

The vehicle body structure of the second aspect of the present disclosure has the effect of being able to protect the battery pack, which is disposed at the lower portion side of the vehicle body, from collision load in the vehicle transverse direction.

The vehicle body structure of the third aspect of the present disclosure has the effect of being able to suppress an increase in the number of assembly processes of a vehicle body, even if the center pillars and the rockers are connected in the vehicle transverse direction and the vehicle vertical direction.

BRIEF DESCRIPTION OF THE DRAWINGS

Exemplary embodiments of the present disclosure will be described in detail based on the following figures, wherein.

DETAILED DESCRIPTION

First Embodiment

Examples of embodiments of a vehicle body structure relating to the present disclosure are described hereinafter by using FIG. 1 through FIG. 5. Note that arrow FR that is shown appropriately in the respective drawings indicates the vehicle front side, arrow UP indicates the vehicle upper side, and arrow OUT indicates the vehicle transverse direction outer side.

Figure 5:
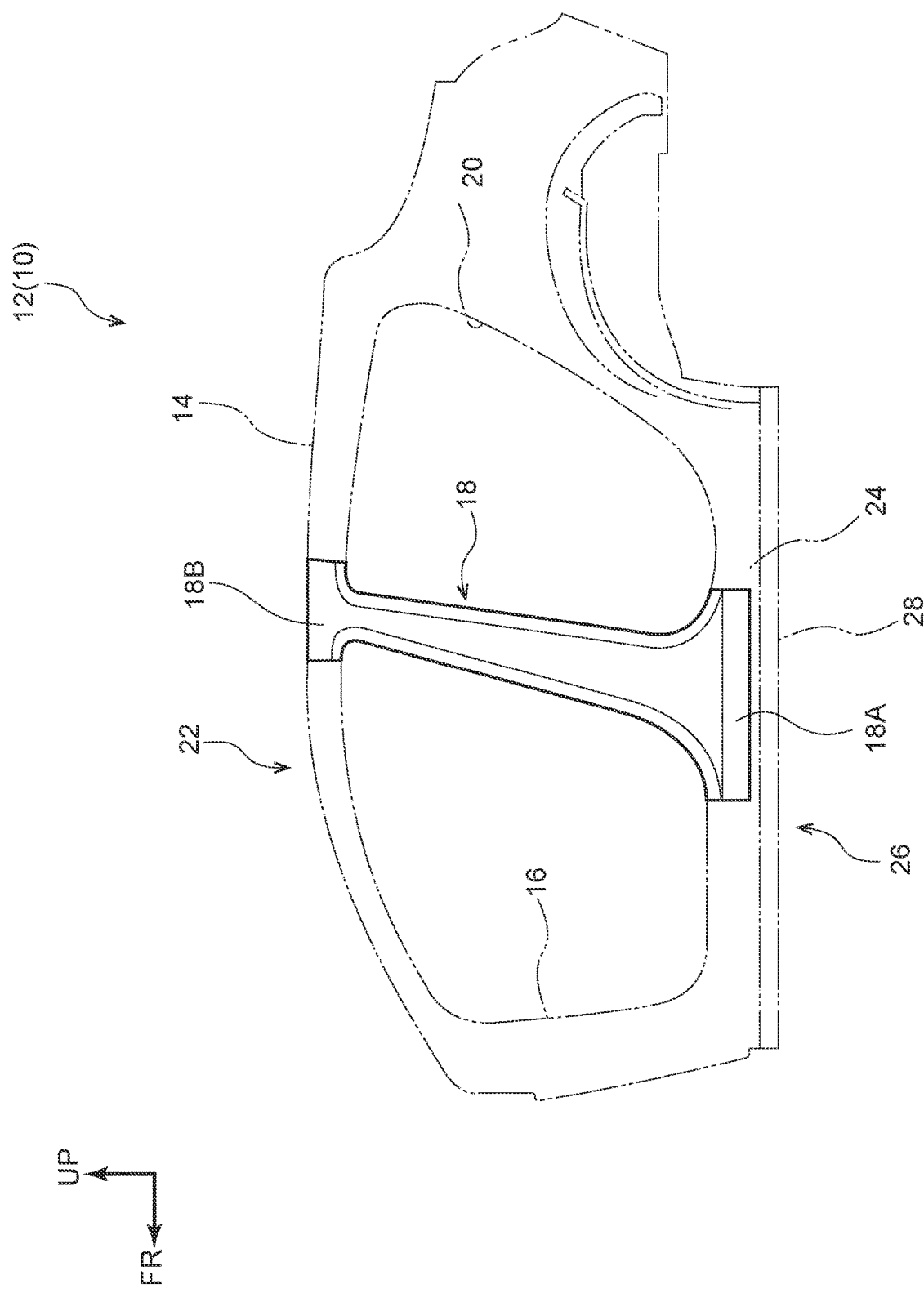
FIG. 5 is a side view illustrating the structure of the vehicle body to which the vehicle body structure relating to the first embodiment is applied.
Figure 6:
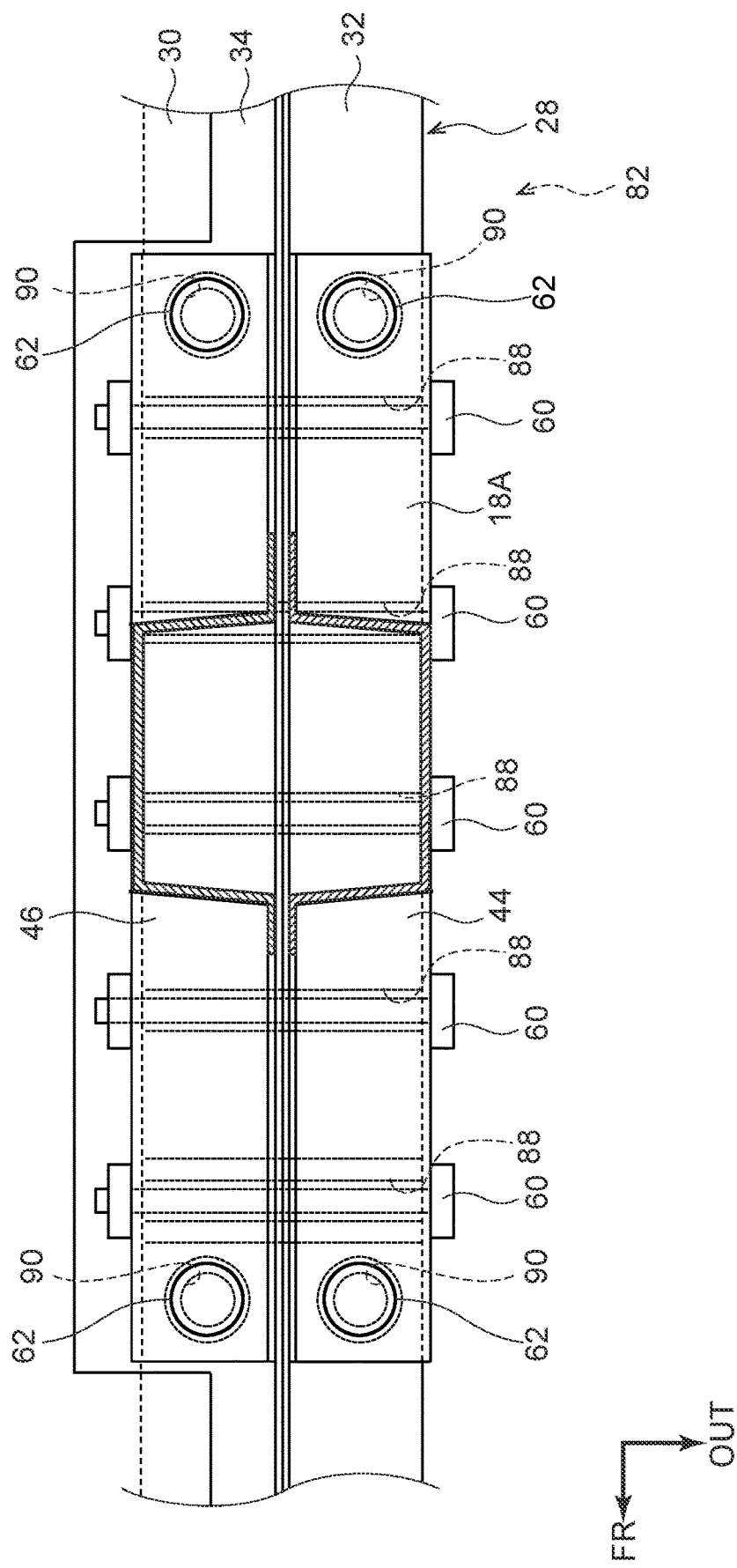
FIG. 6 is a cross-sectional view (a cross-sectional view corresponding to FIG. 2) in which the structure of the places of connecting the center pillar and the rocker at the vehicle body to which a vehicle body structure relating to a second embodiment is applied, is viewed from the vehicle upper side.

First, the schematic structure of a "vehicle body 12" of a "vehicle 10" to which the vehicle body structure relating to the present embodiment is applied is described by using FIG. 5. Note that, in the present embodiment, because the vehicle body 12 is structured so as to basically have left-right symmetry, mainly the structure of the portion at the vehicle transverse direction left side of the vehicle body 12 is described hereinafter, and description of the structure of the portion at the vehicle transverse direction right side is omitted as appropriate.

The vehicle body 12 is structured by an upper body 22 that is structured to include a roof portion 14, front pillars 16, "center pillars 18" and rear pillars 20, and a lower body 26 that is structured to include a "floor portion 24" that serves as the vehicle body lower portion, being detachably connected together.

The present embodiment has a feature in the structure of the places of connection of the center pillar 18 and a "rocker 28" that structures a portion of the floor portion 24. Hereinafter, the structure of the vehicle body 12 will be described in detail, with discussion centering around the center pillar 18 and the rocker 28, which structure main portions of the present embodiment, and structures at the periphery thereof.

Figure 3:
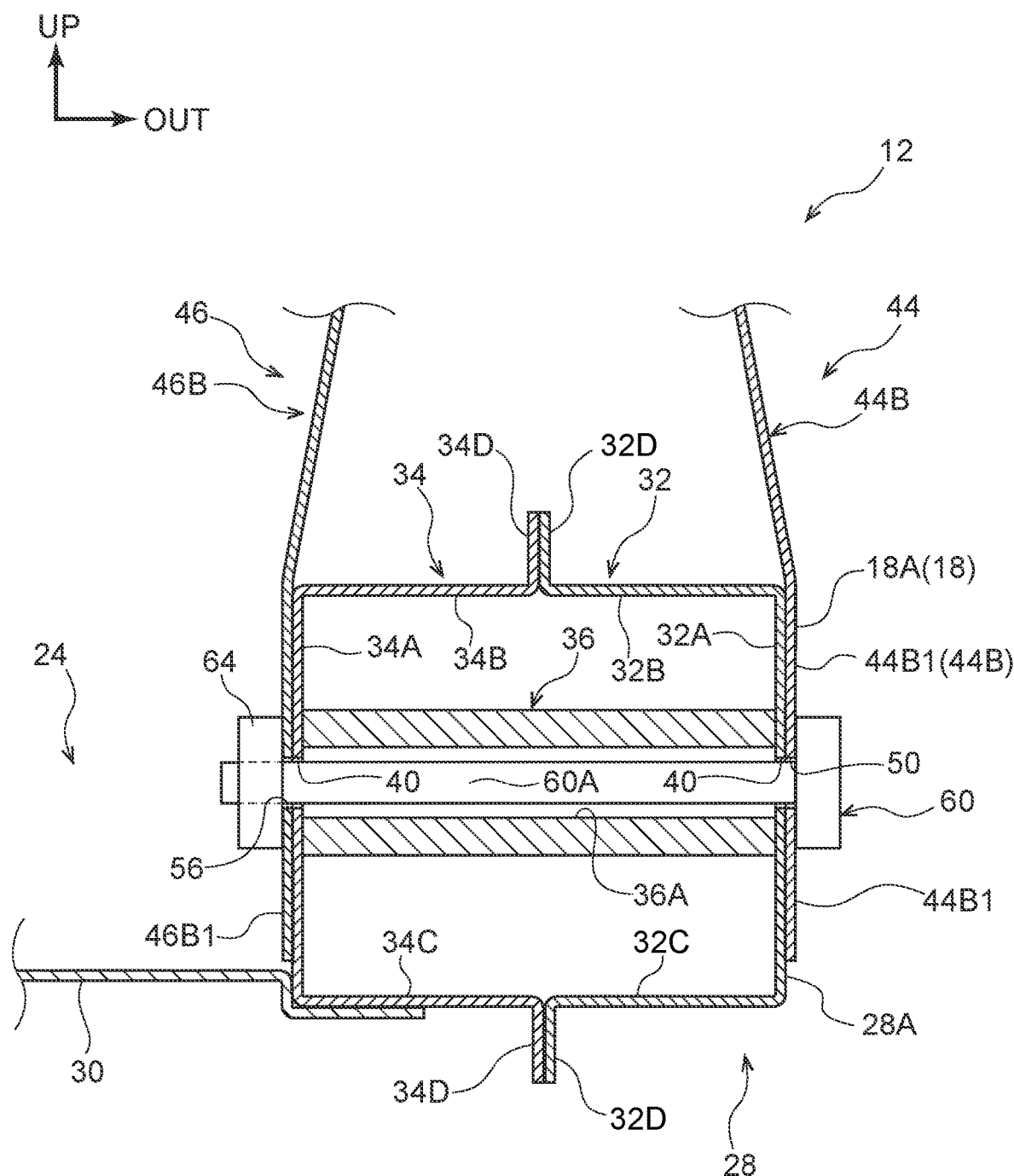
FIG. 3 is a cross-sectional view (a cross-sectional view illustrating the state cut along line 3-3 of FIG. 1) in which the structure of the places of connecting the center pillar and the rocker at the vehicle body to which the vehicle body structure relating to the first embodiment is applied, is viewed from the vehicle front side.
Figure 4:
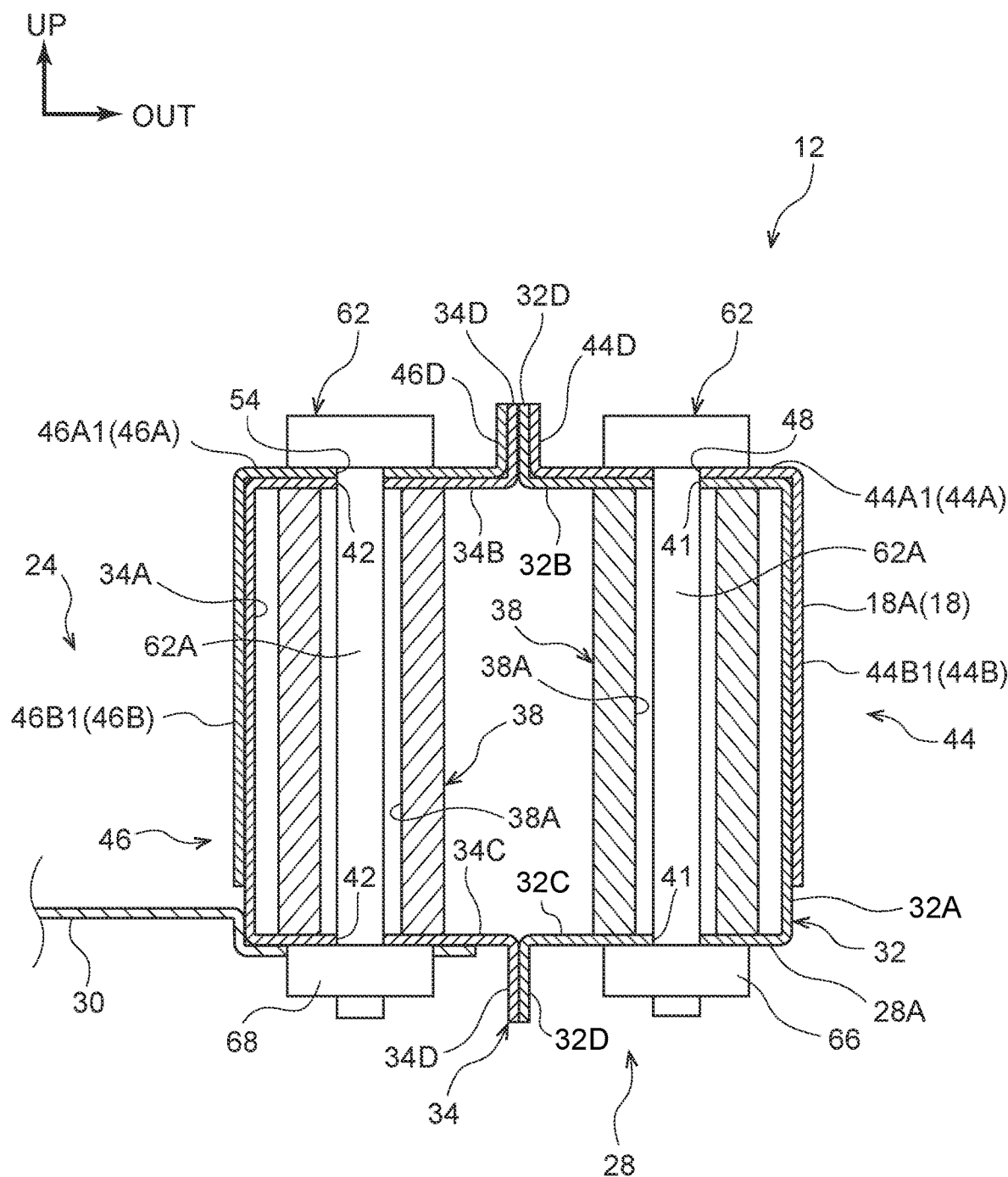
FIG. 4 is a cross-sectional view (a cross-sectional view illustrating the state cut along line 4-4 of FIG. 1) in which the structure of the places of connecting the center pillar and the rocker at the vehicle body to which the vehicle body structure relating to the first embodiment is applied, is viewed from the vehicle front side.

The structure of the floor portion 24 is described first. As illustrated in FIG. 3 and FIG. 4, the floor portion 24 has a floor panel 30 that is formed by a steel sheet being press-worked and that extends in the vehicle longitudinal direction and the vehicle transverse direction as seen from the vehicle vertical direction. The pair of rockers 28 are disposed at the vehicle transverse direction outer sides of the floor panel 30 so as to run along the peripheral edge portions that are at the vehicle transverse direction outer sides of the floor panel 30, respectively.

The rocker 28 extends in the vehicle longitudinal direction, and is structured to include a rocker outer 32 that structures the vehicle transverse direction outer side portion thereof, and a rocker inner 34 that structures the vehicle transverse direction inner side portion thereof. Note that the rocker outer 32 and the rocker inner 34 are each structured by a steel sheet being press-worked.

In detail, the rocker outer 32 includes a side wall portion 32A, an upper wall portion 32B, a lower wall portion 32C and a pair of flange portions 32D, and is structured such that the cross-sectional shape thereof as seen from the vehicle longitudinal direction is the shape of a hat whose vehicle transverse direction inner side is open. The side wall portion 32A structures the vehicle transverse direction outer side portion of the rocker outer 32, and is shaped as a plate whose plate thickness direction is the vehicle transverse direction and that extends in the vehicle longitudinal direction. The upper wall portion 32B extends at the vehicle upper and inner side from the vehicle upper side peripheral edge portion of the side wall portion 32A. The lower wall portion 32C extends at the vehicle lower and inner side from the vehicle lower side peripheral edge portion of the side wall portion 32A. The flange portions 32D extend from the vehicle upper side peripheral edge portion of the upper wall portion 32B toward the vehicle upper side, and from the vehicle lower side peripheral edge portion of the lower wall portion 32C toward the vehicle lower side, respectively.

On the other hand, the rocker inner 34 is basically structured symmetrically to the rocker outer 32 in the vehicle transverse direction. Specifically, the rocker inner 34 includes a side wall portion 34A, an upper wall portion 34B, a lower wall portion 34C and a pair of flange portions 34D, and is structured such that the cross-sectional shape thereof as seen from the vehicle longitudinal direction is the shape of a hat whose vehicle transverse direction outer side is open.

Due to the flange portions 32D of the rocker outer 32 and the flange portions 34D of the rocker inner 34 being joined at unillustrated joined portions that are joined by welding or the like, the rocker 28 has a closed cross-sectional structure in which the cross-section, as seen from the vehicle longitudinal direction, is a closed cross-section that is polygonal such as substantially rectangular or substantially hexagonal. Note that the vehicle transverse direction outer side peripheral edge portion of the floor panel 30 is joined to the rocker inner 34 at unillustrated joined portions that are joined by welding or the like, in a state in which the floor panel 30 is made to abut the rocker inner 34 from the vehicle lower side thereof.

Figure 1:
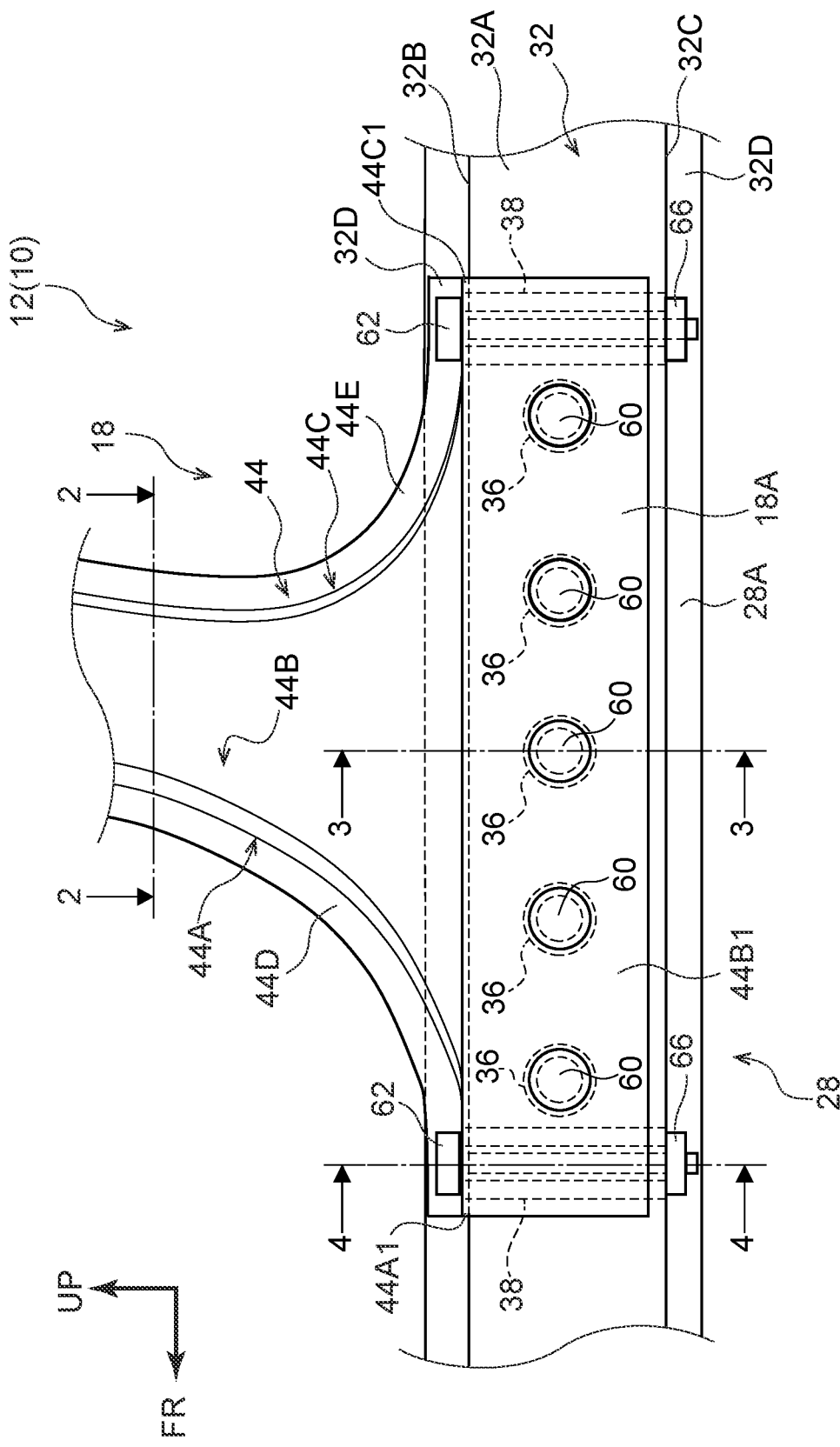
FIG. 1 is a side view (a view in the direction of arrow 1 of FIG. 2) illustrating the structure of places of connecting a center pillar and a rocker at a vehicle body to which a vehicle body structure relating to a first embodiment is applied.
Figure 2:
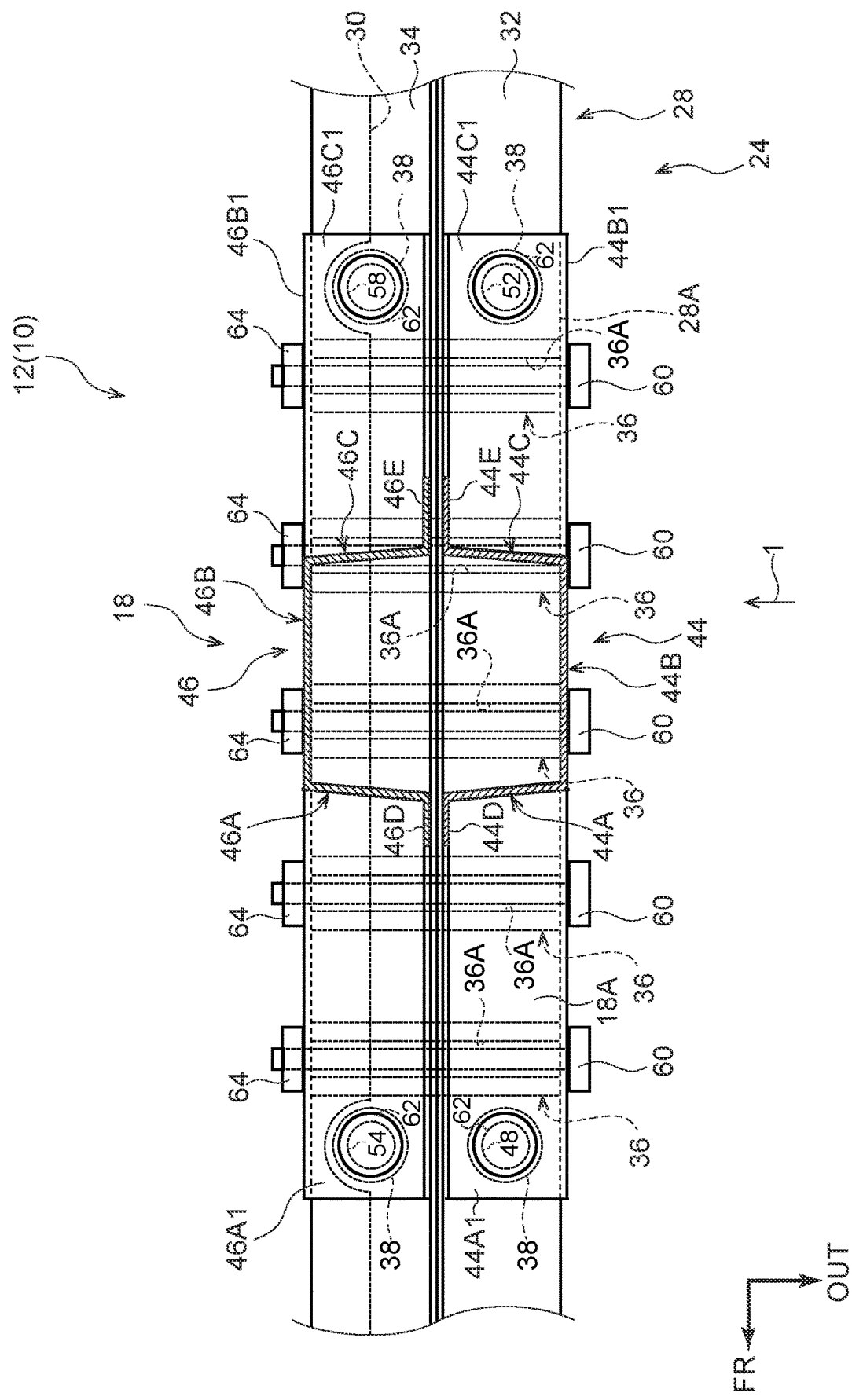
FIG. 2 is a cross-sectional view (a cross-sectional view illustrating the state cut along line 2-2 of FIG. 1) in which the structure of the places of connecting the center pillar and the rocker at the vehicle body to which the vehicle body structure relating to the first embodiment is applied, is viewed from the vehicle upper side.

Further, as illustrated in FIG. 1 and FIG. 2, the vehicle longitudinal direction central portion of the rocker 28 is a connected portion 28A that is connected to the center pillar 18. Plural "collars 36" that serve as transverse direction supporting portions and plural "collars 38" that serve as vertical direction supporting portions are disposed at the interior of the connected portion 28A.

As illustrated in FIG. 3 as well, the collar 36 is formed of metal as an example, and is shaped as a cylindrical tube, and is disposed with the axial direction thereof being the vehicle transverse direction. Namely, a "through-portion 36A", which serves as a transverse direction through-portion and is formed in the collar 36, extends in the vehicle transverse direction. Plural (e.g., five of the) collars 36 are disposed at the vehicle vertical direction central portion of the rocker 28 at a predetermined interval in the vehicle longitudinal direction.

The vehicle transverse direction outer side end portion of the collar 36 is joined to the side wall portion 32A of the rocker outer 32, and the vehicle transverse direction inner side end portion of the collar 36 is joined to the side wall portion 34A of the rocker inner 34, respectively at unillustrated joined portions that are joined by welding or the like. Through-portions 40 are formed in the side wall portion 32A and the side wall portion 34A at positions overlapping the through-portions 36A.

On the other hand, although the structure of the collar 38 is basically similar to that of the collar 36, the collar 38 is disposed with the axial direction thereof being the vehicle vertical direction, as illustrated in FIG. 4 as well. Namely, a "through-portion 38A", which serves as a vertical direction through-portion and is formed in the collar 38, extends in the vehicle vertical direction. Plural (e.g., two of the) collars 38 are disposed at each of a vehicle longitudinal direction one side portion and the vehicle longitudinal direction other side portion of the connected portion 28A, at a predetermined interval in the vehicle transverse direction.

In detail, the collars 38 are disposed so as to overlap one another as seen from the vehicle transverse direction. At the collars 38 that are at the vehicle transverse direction outer side, the vehicle upper side end portion thereof is joined to the upper wall portion 32B of the rocker outer 32, and the vehicle lower side end portion thereof is joined to the lower wall portion 32C of the rocker outer 32, at unillustrated joined portions that are joined by welding or the like, respectively. Further, through-portions 41 are formed in the upper wall portion 32B and the lower wall portion 32C respectively at positions overlapping the through-portions 38A.

On the other hand, at the collars 38 that are at the vehicle transverse direction inner side, the vehicle upper side end portion thereof is joined to the upper wall portion 34B of the rocker inner 34, and the vehicle lower side end portion thereof is joined to the lower wall portion 34C of the rocker inner 34, at unillustrated joined portions that are joined by welding or the like, respectively. Further, through-portions 42 are formed in the upper wall portion 34B and the lower wall portion 34C respectively at positions overlapping the through-portions 38A.

Returning to FIG. 2, the center pillar 18 is structured to include a pillar outer 44 that structures the vehicle transverse direction outer side portion thereof, and a pillar inner 46 that structures the vehicle transverse direction inner side portion thereof. Note that the pillar outer 44 and the pillar inner 46 are each structured by a steel sheet being press-worked.

In detail, as illustrated in FIG. 1 as well, the width of the pillar outer 44 increases from the vehicle upper side toward the vehicle lower side, as seen from the vehicle transverse direction. Further, the pillar outer 44 is structured to include a front wall portion 44A structuring the vehicle front side portion thereof, an outer wall portion 44B structuring the vehicle transverse direction outer side portion thereof, and a rear wall portion 44C structuring the vehicle rear side portion thereof.

The main portion of the front wall portion 44A is shaped as a plate whose plate thickness direction is the vehicle longitudinal direction and that extends in the vehicle vertical direction. On the other hand, the portion, which structures a "lower portion" 18A of the center pillar 18, at the front wall portion 44A has the vehicle vertical direction as the plate thickness direction thereof, and is positioned at the vehicle upper side of the vehicle front and outer side portion of the connected portion 28A, and is in a state of abutting the connected portion 28A. Note that, hereinafter, this portion at the front wall portion 44A is called an "upper side wall portion 44A1". As seen from the vehicle vertical direction, a "through-portion 48" serving as an upper side inserted-through portion is formed in the upper side wall portion 44A1 at a position overlapping the through-portion 38A of the collar 38.

The outer wall portion 44B has the vehicle transverse direction as the plate thickness direction thereof, and extends in the vehicle vertical direction. The portion, which structures the lower portion 18A, at the outer wall portion 44B is positioned at the vehicle transverse direction outer side of the connected portion 28A, and is in a state of abutting the connected portion 28A. Note that, hereinafter, this portion at the outer wall portion 44B is called an "outer side wall portion 44B1". As seen from the vehicle transverse direction, "through-portions 50" serving as outer side inserted-through portions are formed in the outer side wall portion 44B1 at positions overlapping the through-portions 36A of the collars 36 (see FIG. 3).

The main portion of the rear wall portion 44C is shaped as a plate whose plate thickness direction is the vehicle longitudinal direction and that extends in the vehicle vertical direction. On the other hand, the portion, which structures the lower portion 18A, at the rear wall portion 44C has the vehicle vertical direction as the plate thickness direction thereof, and is positioned at the vehicle upper side of the vehicle rear and outer side portion of the connected portion 28A, and is in a state of abutting the connected portion 28A. Note that, hereinafter, this portion at the rear wall portion 44C is called an "upper side wall portion 44C1". As seen from the vehicle vertical direction, a "through-portion 52" serving as an upper side inserted-through portion is formed in the upper side wall portion 44C1 at a position overlapping the through-portion 38A of the collar 38.

Note that a flange portion 44D extends toward the vehicle front side from the vehicle transverse direction inner side peripheral edge portion of the front wall portion 44A, and a flange portion 44E extends toward the vehicle rear side from the vehicle transverse direction inner side peripheral edge portion of the rear wall portion 44C.

On the other hand, as illustrated in FIG. 2, the pillar inner 46 is a structure that is basically symmetrical to the pillar outer 44 in the vehicle transverse direction, and is structured to include a front wall portion 46A structuring the vehicle front side portion thereof, an inner wall portion 46B structuring the vehicle transverse direction inner side portion thereof, and a rear wall portion 46C structuring the vehicle rear side portion thereof.

In detail, the portion, which structures the lower portion 18A, at the front wall portion 46A has the vehicle vertical direction as the plate thickness direction thereof, and is positioned at the vehicle upper side of the vehicle front and inner side portion of the connected portion 28A, and is in a state of abutting the connected portion 28A. Note that, hereinafter, this portion at the front wall portion 46A is called an "upper side wall portion 46A1". As seen from the vehicle vertical direction, a "through-portion 54" serving as an upper side inserted-through portion is formed in the upper side wall portion 46A1 at a position overlapping the through-portion 38A of the collar 38 (see FIG. 3).

The portion, which structures the lower portion 18A, at the inner wall portion 46B is positioned at the vehicle transverse direction inner side of the connected portion 28A, and is in a state of abutting the connected portion 28A. Note that, hereinafter, this portion at the inner wall portion 46B is called an "inner side wall portion 46B1". Further, as seen from the vehicle transverse direction, "through-portions 56" serving as inner side inserted-through portions are formed in the inner side wall portion 46B1 at positions overlapping the through-portions 36A of the collars 36 (see FIG. 3).

Moreover, the portion, which structures the lower portion 18A, at the rear wall portion 46C has the vehicle vertical direction as the plate thickness direction thereof, and is positioned at the vehicle upper side of the vehicle rear and inner side portion of the connected portion 28A, and is in a state of abutting the connected portion 28A. Note that, hereinafter, this portion at the rear wall portion 46C is called an "upper side wall portion 46C1". As seen from the vehicle vertical direction, a "through-portion 58" serving as an upper side inserted-through portion is formed in the upper side wall portion 46C1 at a position overlapping the through-portion 38A of the collar 38.

Note that a flange portion 46D extends toward the vehicle front side from the peripheral edge portion at the vehicle transverse direction outer side of the front wall portion 46A, and a flange portion 46E extends toward the vehicle rear side from the peripheral edge portion at the vehicle transverse direction outer side of the rear wall portion 46C.

Further, the pillar outer 44 and the pillar inner 46 are made integral due to the flange portion 44D being joined to the flange portion 46D, and the flange portion 44E being joined to the flange portion 46E, at unillustrated joined portions that are joined by welding or the like, respectively. Note that the center pillar 18 that is structured as described above is a closed cross-sectional structure in which the cross-sectional shape viewed from the vehicle vertical direction is a closed cross-section.

Further, as illustrated in FIG. 1 through FIG. 4, the lower portion 18A of the center pillar 18 is connected to the connected portion 28A of the rocker 28 by plural "bolts 60" serving as transverse direction mounting portions and plural "bolts 62" serving as vertical direction mounting portions.

In detail, weld nuts 64 are joined to the inner side wall portion 46B1 of the pillar inner 46 from the vehicle transverse direction inner side at unillustrated joined portions that are joined by welding or the like, with respect to the plural through-portions 56 respectively. Shaft portions 60A of the bolts 60 are fastened to the weld nuts 64 in the vehicle transverse direction, in states of being inserted-through the through-portions 50 of the pillar outer 44, the through-portions 40 of the rocker 28, the through-portions 36A of the collars 36 and the through-portions 56 of the pillar inner 46.

On the other hand, weld nuts 66 are joined to the lower wall portion 32C of the rocker outer 32 from the vehicle lower side at unillustrated joined portions that are joined by welding or the like, with respect to the plural through-portions 41 respectively. Shaft portions 62A of the bolts 62 are fastened to the weld nuts 66 in the vehicle vertical direction, in states of being inserted-through the through-portion 48 or the through-portion 52 of the pillar outer 44, the through-portions 41 of the rocker 28, and the through-portions 38A of the collars 38.

Further, weld nuts 68 are joined to the lower wall portion 34C of the rocker inner 34 from the vehicle lower side at unillustrated joined portions that are joined by welding or the like, with respect to the plural through-portions 42 respectively. The shaft portions 62A of the bolts 62 are fastened to the weld nuts 68 in the vehicle transverse direction, in states of being inserted-through the through-portion 54 or the through-portion 58 of the pillar inner 46, the through-portions 42 of the rocker 28, and the through-portions 38A of the collars 38.

Note that, in the state in which the lower portion 18A of the center pillar 18 is connected to the connected portion 28A, a portion of the flange portion 32D at the vehicle upper side of the rocker outer 32, and a portion of the flange portion 34D at the vehicle upper side of the rocker inner 34, are nipped between the pillar outer 44 and the pillar inner 46.

Although an upper portion 18B of the center pillar 18 is connected to the roof portion 14 in the same way as the lower portion 18A, the upper portion 18B may be joined to the roof portion 14 at unillustrated joined portions that are joined by welding or the like (see FIG. 5).

Operation and Effects of Present Embodiment

Operation and effects of the present embodiment are described next.

In the present embodiment, as illustrated in FIG. 5, a portion of the vehicle transverse direction outer side of the floor portion 24 of the vehicle body 12 is structured by the rocker 28. The cross-section of this rocker as seen from the vehicle longitudinal direction is a closed cross-section, and the rocker extends in the vehicle longitudinal direction.

In the present embodiment, as illustrated in FIG. 1 and FIG. 2, the center pillar 18 is a part that is separate from the rocker 28. The lower portion 18A that is at the vehicle lower side of this center pillar 18 has the outer side wall portion 44B1 positioned at the vehicle transverse direction outer side of the rocker 28, and the inner side wall portion 46B1 positioned at the vehicle transverse direction inner side of the rocker 28.

By the way, it is thought that, in a structure in which the places where the center pillar 18 and the rocker 28 are connected together are dispersed at the outer side wall portion 44B1 side and the inner side wall portion 46B1 side of the center pillar 18, the number of processes of assembling the vehicle body 12 will increase.

Here, in the present embodiment, the collars 36 are disposed at the interior of the rocker 28. The through-portions 36A that extend in the vehicle transverse direction are formed in these collars 36. Further, as illustrated in FIG. 3 as well, the through-portions 50 are provided in the outer side wall portion 44B1 of the center pillar 18, and the through-portions 56 are provided in the inner side wall portion 46B1.

The rocker 28 and the lower portion 18A of the center pillar 18 are detachably connected by the bolts 60 that are inserted-through the through-portions 50, the through-portions 56, and the through-portions 36A of the collars 36 in the vehicle transverse direction.

Therefore, in the present embodiment, the places of connection of the rocker 28 and the center pillar 18 are aggregated in the vehicle transverse direction, and the rocker 28 and the center pillar 18 can be connected without work for connecting the rocker 28 and the center pillar 18 being carried out at both the vehicle transverse direction outer side and the vehicle transverse direction inner side.

Accordingly, in the present embodiment, a reduction in the number of assembly processes of the vehicle body 12, in which the center pillar 18 and the rocker 28 are structured as separate parts and are connected together, can be devised.

Further, in the present embodiment, as described above, the collars 36 are disposed between the outer side wall portion 44B1 and the inner side wall portion 46B1 of the center pillar 18. Therefore, at the time when a collision load in the vehicle transverse direction is inputted to the vehicle body 12, that collision load is dispersed via the collars 36 to the vehicle transverse direction outer side and the vehicle transverse direction inner side at the lower portion 18A of the center pillar 18. As a result, in the present embodiment, when collision load in the vehicle transverse direction is inputted to the vehicle body 12, the generation of places where stress concentrates at the lower portion 18A is suppressed, and the connected state of the center pillar 18 and the rocker 28 being cancelled can be suppressed.

Further, in the present embodiment, as illustrated in FIG. 4, the collars 38 are disposed at the interior of the rocker 28. The through-portions 38A that extend in the vehicle vertical direction are formed in the collars 38.

On the other hand, as illustrated in FIG. 2 as well, the upper side wall portion 44A1, the upper side wall portion 44C1, the upper side wall portion 46A1 and the upper side wall portion 46C1, which are positioned at the vehicle upper side of the rocker 28, are provided at the lower portion 18A of the center pillar 18. Further, the through-portion 48 is provided in the upper side wall portion 44A1, the through-portion 52 is provided in the upper side wall portion 44C1, the through-portion 54 is provided in the upper side wall portion 46A1, and the through-portion 58 is provided in the upper side wall portion 46C1.

Further, the rocker 28 and the lower portion 18A of the center pillar 18 are detachably connected by the bolts 62 that are inserted-through the through-portions 38A of the collars 38, and one of the through-portion 48, the through-portion 52, the through-portion 54 and the through-portion 58, in the vehicle vertical direction.

Therefore, in the present embodiment, the places where the rocker 28 and the center pillar 18 are connected are aggregated in the vehicle vertical direction, and the rocker 28 and the center pillar 18 can be connected without work for connecting the rocker 28 and the center pillar 18 being carried out at both the vehicle upper side and the vehicle lower side.

Accordingly, in the present embodiment, even if the center pillar 18 and the rocker 28 are connected in the vehicle transverse direction and the vehicle vertical direction, an increase in the number of assembly processes of the vehicle body 12 can be suppressed.

Further, in the present embodiment, as compared with a structure in which the center pillar 18 and the rocker 28 are joined at joined portions that are joined by welding or the like, the number of processes involved in cancelling the connected state of the center pillar 18 and the rocker 28 are reduced, and accordingly, a reduction in the number of work processes involved in disassembling the vehicle body 12 can be devised.

Second Embodiment

A vehicle body structure relating to a second embodiment of the present disclosure is described next by using FIG. 6 through FIG. 10. Note that structural elements that are common to the above-described first embodiment are denoted by the same reference numerals, and description thereof is omitted as appropriate.

Figure 7:
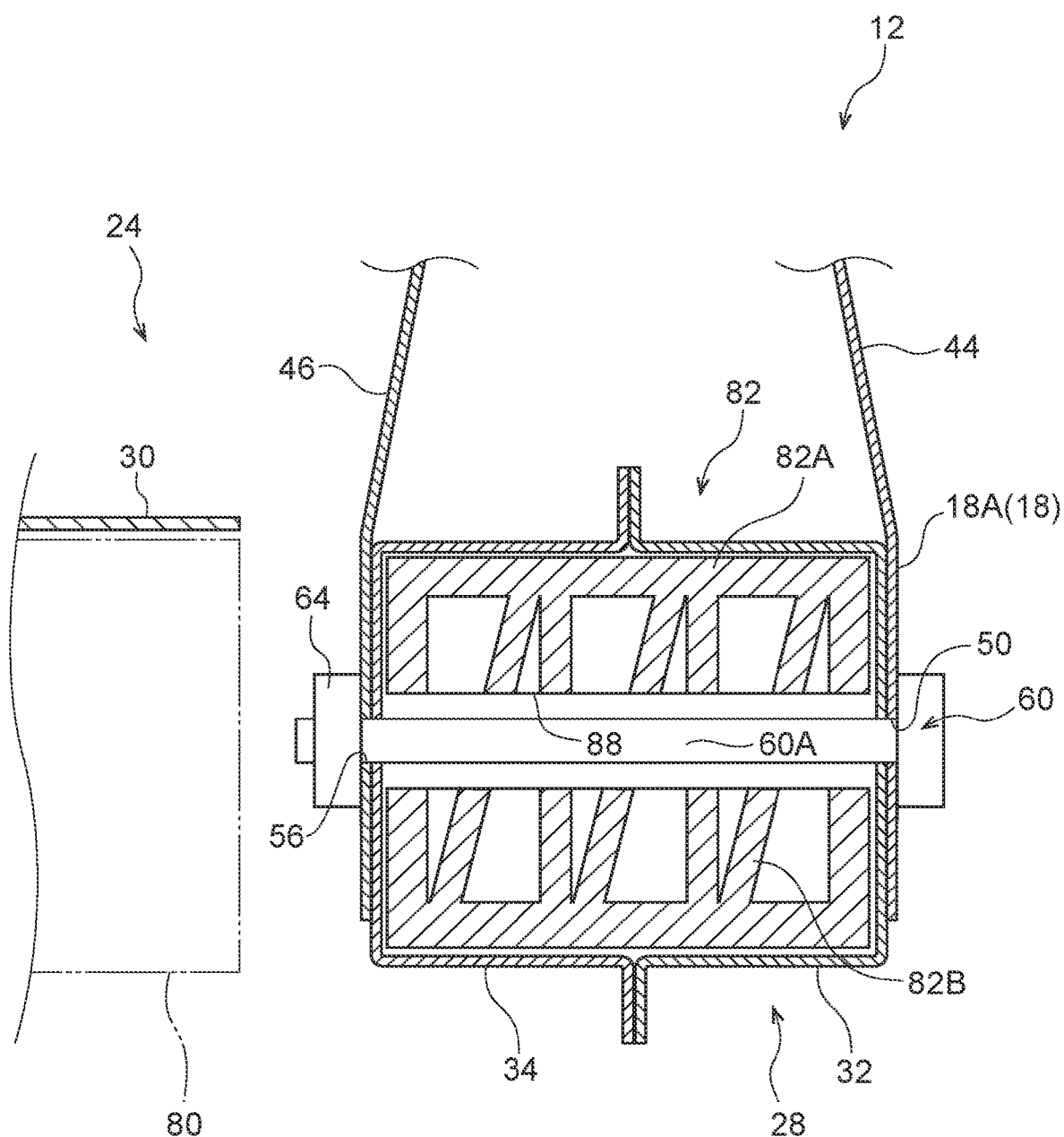
FIG. 7 is a cross-sectional view (a cross-sectional view corresponding to FIG. 3) in which the structure of the places of connecting the center pillar and the rocker at the vehicle body to which the vehicle body structure relating to the second embodiment is applied, is viewed from the vehicle front side.

As illustrated in FIG. 7, the present embodiment has features in the points that a "battery pack" 80 is disposed between the pair of rockers 28, and "impact absorbing members 82" (hereinafter called EA members 82) are disposed within the rockers 28 instead of the collars 36 and the collars 38.

Figure 10:
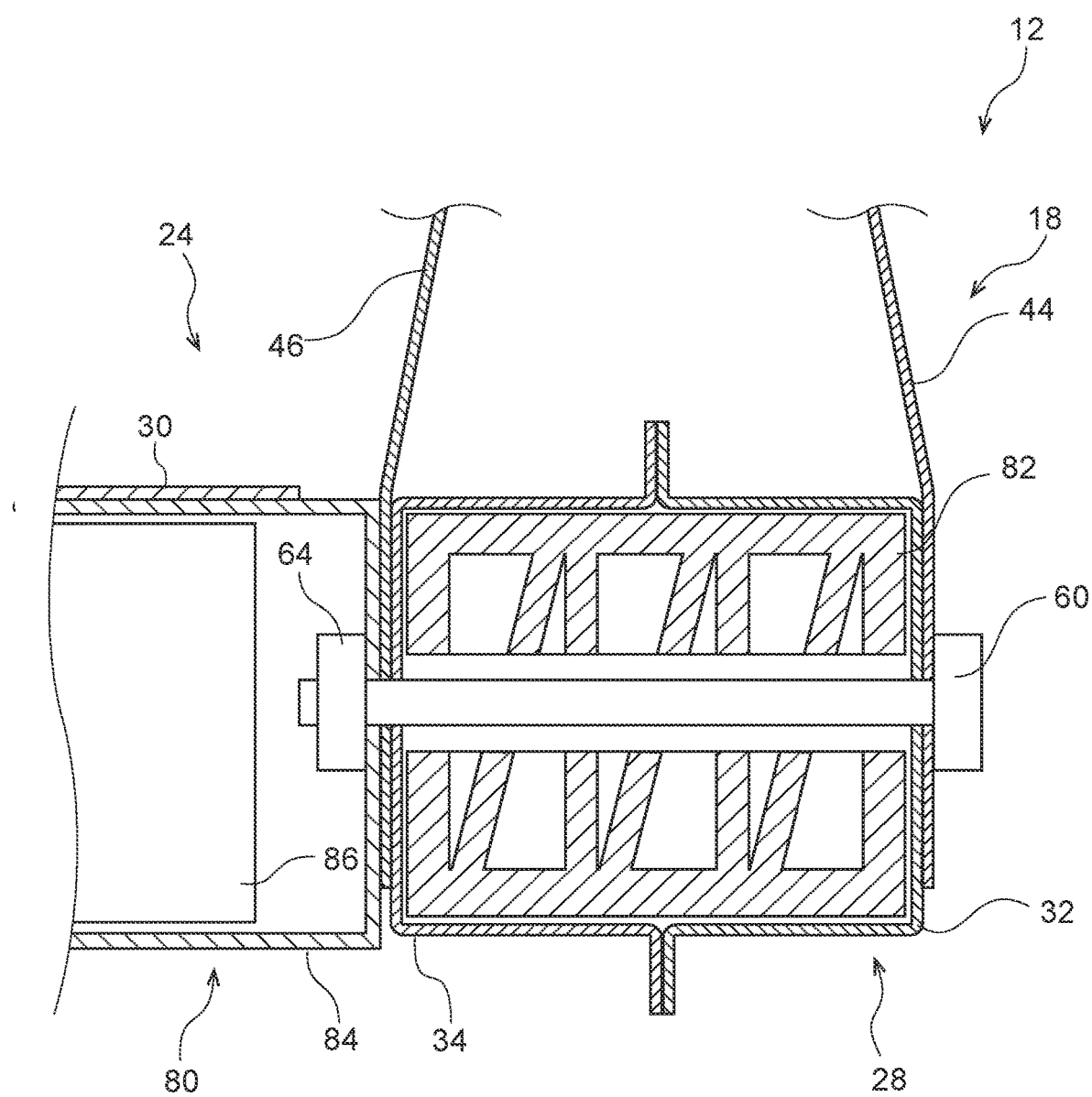
FIG. 10 is a cross-sectional view (a cross-sectional view corresponding to FIG. 7) in which the structure of the places of connecting the center pillar and the rocker at the vehicle body to which a vehicle body structure relating to a second modified example of the second embodiment is applied, is viewed from the vehicle front side.

In detail, the battery pack 80 is structured to include a battery case 84 that is made of aluminum and structures the outer shell of the battery pack 80, and a battery module 86 disposed at the inner side of the battery case 84 (see FIG. 10).

Further, in the present embodiment, the floor panel 30 is joined to the vehicle upper side portion of the rocker 28, and the battery pack 80 is mounted to the floor panel 30 from the vehicle lower side. As seen from the vehicle transverse direction, the battery pack 80 is disposed such that the majority thereof overlaps the rocker 28.

On the other hand, the EA member 82 is structured of an extruded material that is an aluminum alloy or the like. The EA member 82 has an outer wall portion 82A that is formed in the shape of an angular pillar and extends in the vehicle direction, and partitioning wall portions 82B provided at the inner side of the outer wall portion 82A. The EA member 82 can absorb collision load in the vehicle transverse direction. This EA member 82 is joined at unillustrated joined portions that are joined by welding or the like.

As seen from the vehicle transverse direction, "through-portions 88" serving as transverse direction through-portions are formed in the EA member 82 at positions overlapping the through-portions 50 and the through-portions 56 of the center pillar 18. The shaft portions 60A of the bolts 60 are inserted-through the through-portions 88.

Figure 8:
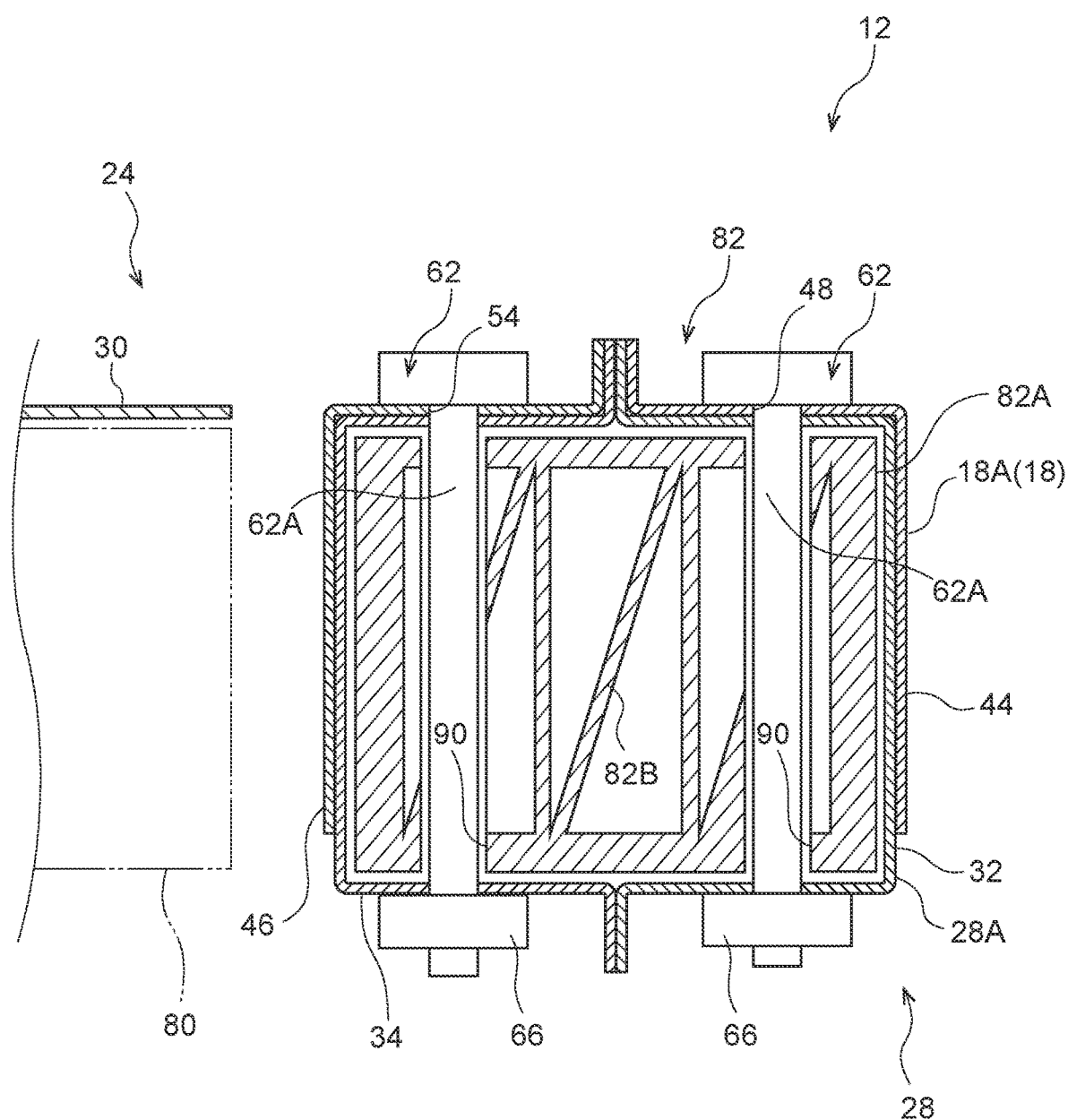
FIG. 8 is a cross-sectional view (a cross-sectional view corresponding to FIG. 4) in which the structure of the places of connecting the center pillar and the rocker at the vehicle body to which the vehicle body structure relating to the second embodiment is applied, is viewed from the vehicle front side.

Further, as illustrated in FIG. 8, "through-portions 90" serving as vertical direction through-portions are formed in the EA member 82 at positions overlapping one of the through-portion 48, the through-portion 52, the through-portion 54 and the through-portion 58 of the center pillar 18, as seen from the vehicle vertical direction. The shaft portions 62A of the bolts 62 are inserted-through the through-portions 90.

In the present embodiment that has the above-described structure, the EA member 82 that can absorb collision load in the vehicle transverse direction is disposed at the interior of the rocker 28. On the other hand, the battery pack 80 is disposed at the vehicle transverse direction inner sides of the rockers 28. The EA members 82 are disposed at positions overlapping the battery pack 80 as seen from the vehicle transverse direction.

Therefore, in the present embodiment, when collision load in the vehicle transverse direction is inputted to the vehicle body 12, before the collision load is inputted to the battery pack 80, at least some of the collision load is absorbed by the EA member 82. Accordingly, in the present embodiment, the battery pack 80 that is disposed at the lower portion side of the vehicle body 12 can be protected from collision load in the vehicle transverse direction.

First Modified Example of Second Embodiment

Figure 9:
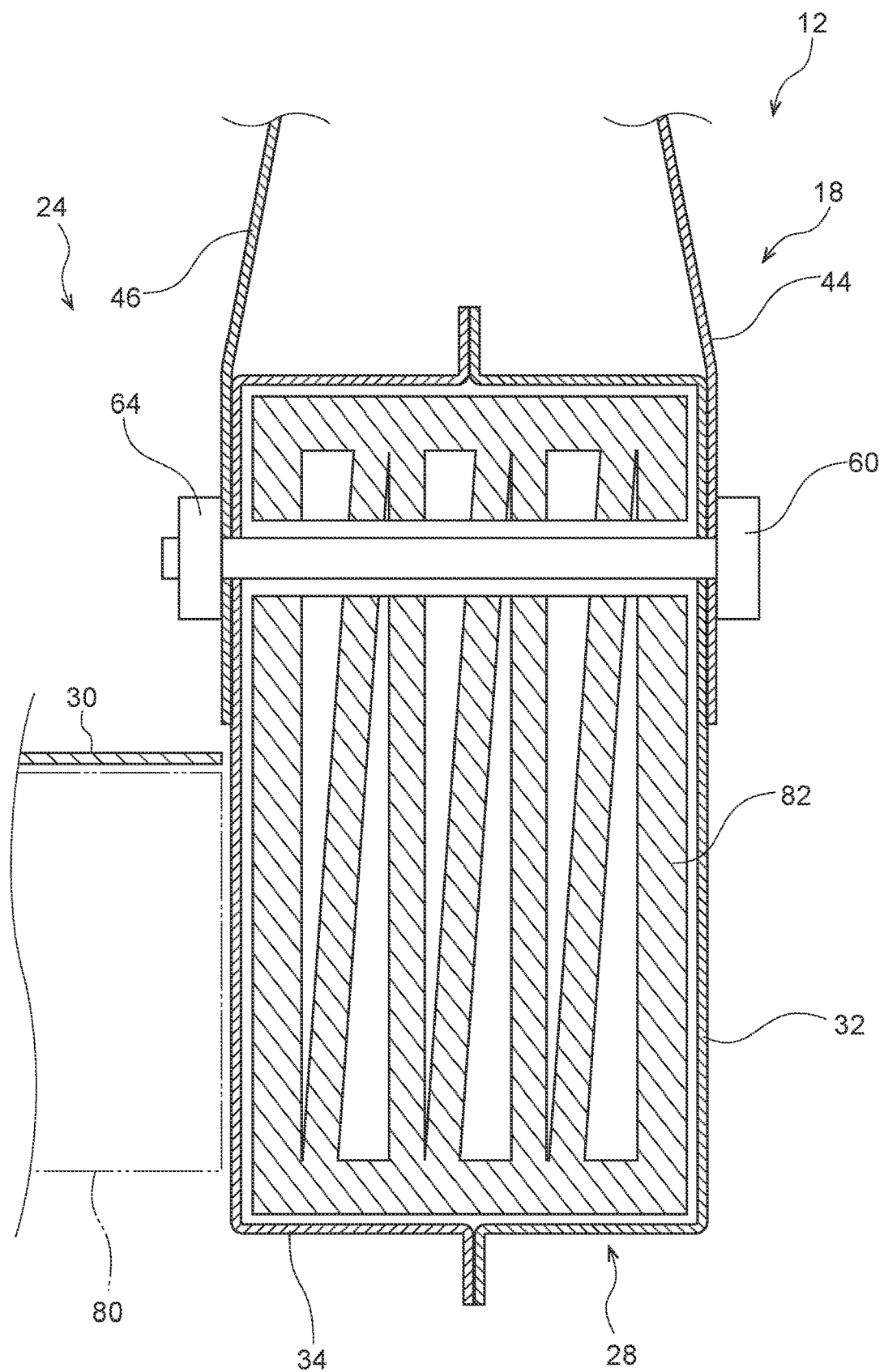
FIG. 9 is a cross-sectional view (a cross-sectional view corresponding to FIG. 7) in which the structure of the places of connecting the center pillar and the rocker at the vehicle body to which a vehicle body structure relating to a first modified example of the second embodiment is applied, is viewed from the vehicle front side.

A vehicle body structure relating to a first modified example of the second embodiment of the present disclosure is described next by using FIG. 9.

Specifically, in the present modified example, the rocker 28 and the EA member 82 extend in the vehicle vertical direction. When viewed from the vehicle transverse direction, the places where the bolts 60 are fastened are changed to positions at which the bolts 60 and the battery pack 80 do not overlap.

In accordance with this structure, the battery pack 80 can be enlarged in the vehicle transverse direction, and as a result, the capacity of the battery pack 80 can be ensured.

Second Modified Example of Second Embodiment

A vehicle body structure relating to a second modified example of the second embodiment of the present disclosure is described next by using FIG. 10.

Specifically, in the present modified example, the positions of the weld nuts 64, which were provided at the inner side wall portion 46B1 of the pillar inner 46, are changed to the vehicle transverse direction inner side surface of a side wall portion 84A that structures the vehicle transverse direction outer side portion of the battery case 84.

In accordance with this structure, the rocker 28 and the battery pack 80 can be set close to one another, and as a result, the capacity of the battery pack 80 can be ensured.

Supplementary Explanation of Above-Described Embodiments (1) In the above-described embodiments, only one of the bolts 60 is disposed in the vehicle vertical direction, but there may be a structure in which the plural bolts 60 are disposed in the vehicle vertical direction in accordance with the specifications of the vehicle 10 or the like. For example, there may be a structure in which the rocker 28 and the EA member 82 extend in the vehicle vertical direction as in the first modified example of the second embodiment, and the outer side wall portion 44B1 is extended in the vehicle vertical direction, and two of the bolts 60 are disposed in the vehicle vertical direction.

(2) Further, although the center pillar 18 and the rocker 28 are connected by using the bolts 60 and the bolts 62 in the above-described embodiments, the present disclosure is not limited to this. Namely, a structure may be employed in which the bolts 62 are not used in connecting the center pillar 18 and the rocker 28, in accordance with the specifications of the vehicle 10 or the like.

(3) In the above-described embodiments, the bolts 60 and the bolts 62 are fastened by the weld nuts. However, nuts, which are not weld nuts and are bodies separate from the vehicle body 12, may be fastened to the bolts 60 and the bolts 62, in accordance with the specifications of the vehicle 10 or the like.

(4) In addition, in the above-described embodiments, the structural members of the vehicle body 12, such as the center pillars 18 and the rockers 28 and the like, are structured by steel members, but these structural members may be structured by carbon fiber reinforced plastic or the like, in accordance with the specifications of the vehicle 10 or the like. Further, if such a structure is employed, the collars 36 and the collars 38 and the like may be joined to the vehicle body 12 at joined portions that are joined by an adhesive or the like.

What is claimed is:
1. A vehicle body structure comprising:
rockers that structure portions of vehicle transverse direction outer sides of a vehicle body lower portion, cross-section of each of the rockers seen from a vehicle longitudinal direction being closed cross-section, and each of the rockers extending in the vehicle longitudinal direction;

center pillars that are separate from the rockers, lower portion of each of the center pillars at a vehicle lower side being structured to include an outer side wall portion that is positioned at vehicle transverse direction outer side of the rocker, and an inner side wall portion that is positioned at vehicle transverse direction inner side of the rocker;

transverse direction supporting portions disposed at interiors of the rockers, at each of the transverse direction supporting portions being formed a transverse direction through-portion that extends in a vehicle transverse direction; and transverse direction mounting portions that are inserted, in the vehicle transverse direction, through outer side inserted-through portions provided in the outer side wall portions, inner side inserted-through portions provided in the inner side wall portions, and the transverse direction through-portions, and that detachably connect the rockers and the lower portions.

2. The vehicle body structure of claim 1, wherein the transverse direction supporting portions are impact absorbing members, the impact absorbing members being able to absorb collision load in the vehicle transverse direction, the transverse direction supporting portions being disposed at positions that, as seen from the vehicle transverse direction, overlap a battery pack disposed at vehicle transverse direction inner sides of the rockers.

3. The vehicle body structure of claim 1, further comprising vertical direction supporting portions disposed at the interiors of the rockers, in each of the vertical direction supporting portions being formed a vertical direction through-portion that extends in a vehicle vertical direction are formed, wherein:

upper side wall portions, which are positioned at vehicle upper sides of the rockers, are provided at the lower portions, and the upper side wall portions are detachably connected to the rockers via vertical direction mounting portions that are inserted, in the vehicle vertical direction, through the vertical direction through-portions and through upper side inserted-through portions that are provided in the upper side wall portions.

* * * * *